Sept. 9, 1958      M. VON ARDENNE      2,851,611

ELECTRON-OPTICAL INSTRUMENTS

Filed March 28, 1956      3 Sheets-Sheet 1

INVENTOR.
Manfred von ARDENNE
BY

Sept. 9, 1958 M. VON ARDENNE 2,851,611
ELECTRON-OPTICAL INSTRUMENTS
Filed March 28, 1956 3 Sheets-Sheet 2
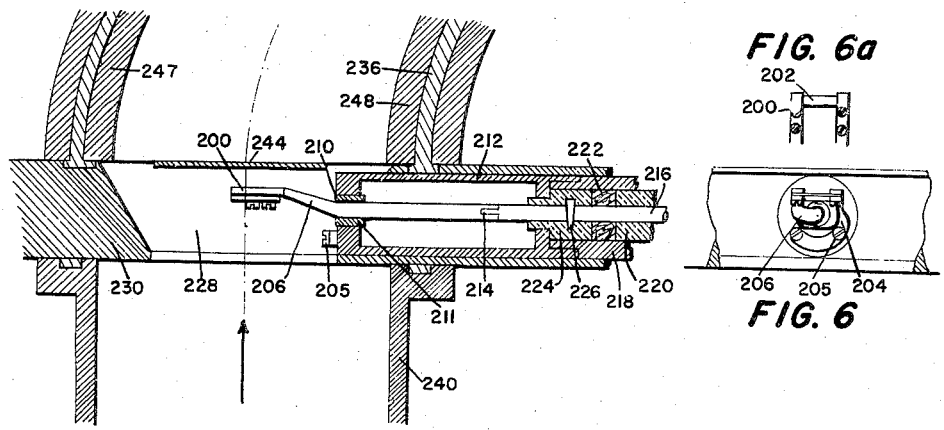
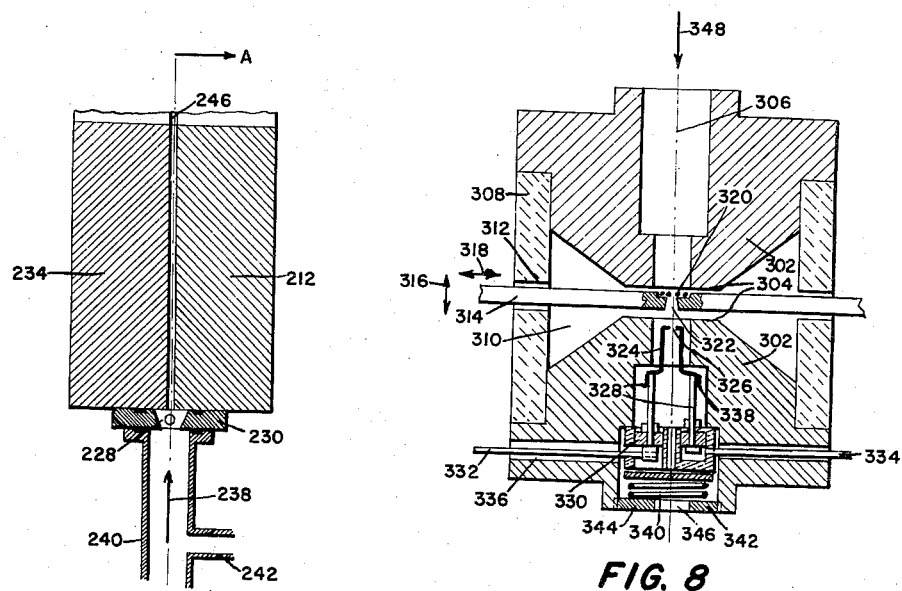
INVENTOR.
Manfred von Ardenne Sept. 9, 1958
M. VON ARDENNE
2,851,611
ELECTRON-OPTICAL INSTRUMENTS
Filed March 28, 1956
3 Sheets-Sheet 3
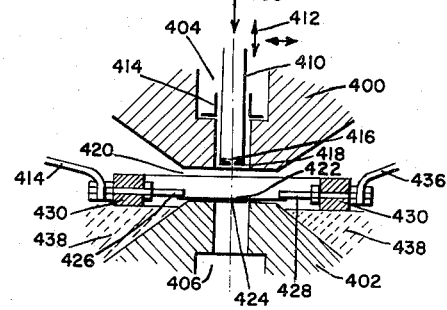
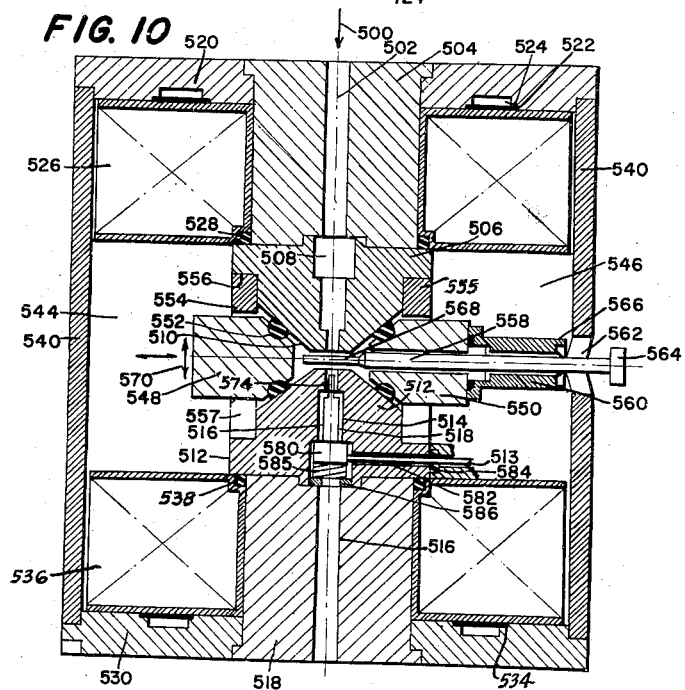
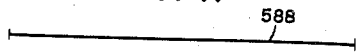

United States Patent Office 2,851,611
Patented Sept. 9, 1958

2,851,611

ELECTRON-OPTICAL INSTRUMENTS

Manfred von Ardenne, Dresden-Weisser Hirsch, Germany, assignor to VEB Vakutronik Dresden, Dresden, Germany Application March 28, 1956, Serial No. 574,420

Claims priority, application Germany May 10, 1955

8 Claims. (Cl. 250—49.5)

The present invention relates to electron-optical instruments, and more particularly to instruments having a diaphragm and magnetic poles.

It is an object of the present invention to render the diaphragm free from polarizing charges which would lead to disturbances of the parts of the beams or rays passing through the diaphragm or to indefined deviations of the rays.

It is a further object of the present invention to increase the resolving power of an optical instrument provided with a diaphragm according to the present invention.

It is still another object of the present invention to increase the effectiveness of the magnetic pole pieces forming part of the electron-optical instrument.

It is still a further object of the present invention to improve the axial symmetry of fields of magnetic lenses.

Figure 1:
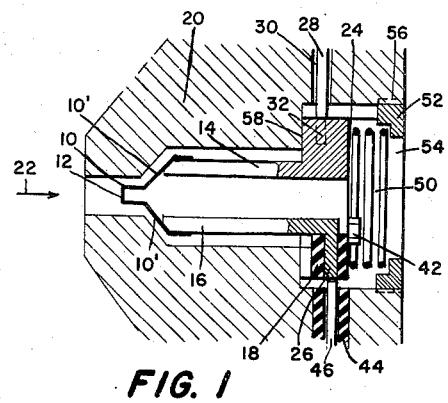
Figure 2:
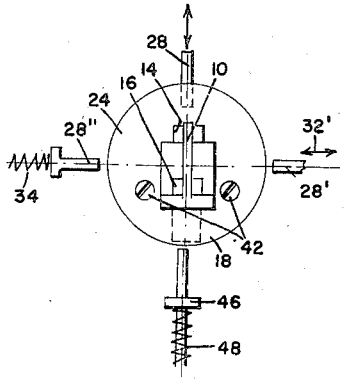
Figure 3:
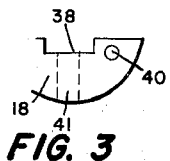
Figure 4:
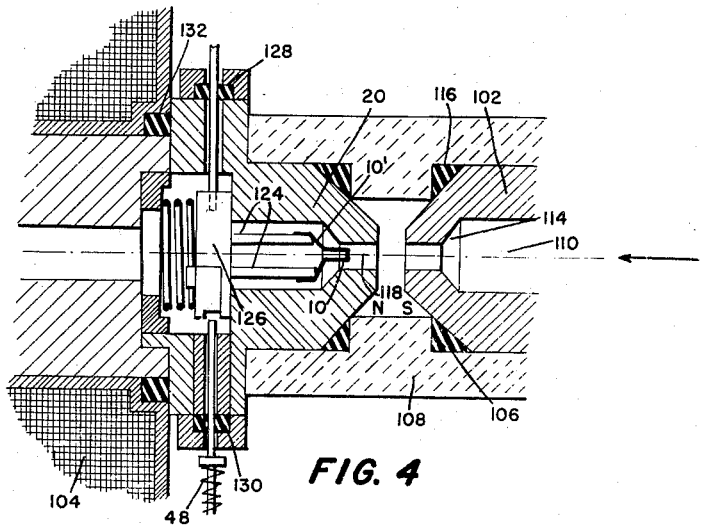

Other objects and advantages of the present invention will be apparent from the following detailed description thereof in connection with the accompanying drawings showing, by way of example, some embodiments of a diaphragm and an electron-optical instrument according to the present invention. In the drawings, Fig. 1 is a sectional elevation of part of a first embodiment of the present invention, Fig. 2 is a plan view of parts of Fig. 1 seen from the right, some parts being shown in an exploded view, Fig. 3 is a separate view of a part of Fig. 2, Fig. 4 is a sectional elevation of parts shown in Fig. 1 on a reduced scale with outer parts, Fig. 5 is a sectional elevation of a second embodiment of the present invention taken along the line A—B of Fig. 7, Fig. 6 is a plan view of a part of the device shown in Fig. 5, Fig. 6a is a top view of part of Fig. 6, Fig. 7 is a section on a reduced scale of the device shown in Fig. 5 taken at right angles thereto, Fig. 8 is a sectional view of another embodiment of the present invention, Fig. 9 is a partial sectional view of a further embodiment of the present invention, Fig. 10 is a sectional view of the total arrangement of an objective according to the present invention, and Fig. 11 is a scale indication.

Referring now to the drawings, and first to the embodiment shown in Figs. 1–4, a diaphragm for a magnetic pole piece lens forming part of an electron microscope of a very large resolving power is shown.

The diaphragm consists of a platinum ribbon or band 10 provided with a boring 12, the ribbon or strip 10 having preferably a width amounting to approximately 1 millimeter, the boring 12 having a diameter amounting, for instance to 30μ. The band or ribbon 10 has outwardly flaring parts 10' secured to holding rods 14 and 16 consisting of metal, the holding rod 16 being insulated by an insulator 18. The holding rod 14 is preferably at ground potential whereas the holding rod 16 is imparted a different potential by the insulated current carrying member 46 to be described more in detail hereinafter.

The platinum band or strip 10 is arranged within the narrowest part of a hollow space defined by a pole piece 20 consisting of magnetic material. The incoming beam 22 of electrons or ions passes through the boring 12 of the band 10. The holding rods 14 and 16 are arranged with the feet 24 and 26 thereof inside the widest part of the hollow space of the pole piece 20 and held in position by diaphragm centering members 28, 28' and 28" passing through holes such as 30 of the magnetic pole piece 20 and entering borings such as 32 provided in the base plate 24 of the holding rod 14. The centering members 28 and 28' are subjected by a mechanism (not shown) to rectilinear motions in both directions indicated by the arrows 32' whereas the centering member 28" is held in position by a spring 34 resting against a part (not shown) forming part of the magnetic pole piece 20. As a further centering member serves the insulated current carrying member 46 mentioned hereinafter with the spring 48.

An insulating plate 18 having the shape of a circular segment forms the complement of the foot portion 24 and is provided with a recess 38 and a rectangular hole 41 for accommodating the foot 26 of the holder 16. The attachment of the foot 26 of the holding rod 16 to the insulating plate 18 is effected, for instance by riveting. The insulating plate 18 is provided with holes 40 for the shafts of screws 42 screwed into the foot 24. The insulating member 18 is continued by an insulating member 44 forming the wall of a boring of the pole piece 20, said boring receiving a current carrying member 46. It will be appreciated that in this way current is supplied by the current carrying member 46 to the foot 26 of the holding rod 16 which is connected with one of the outwardly flaring parts 10' of the platinum ribbon or band 10.

A spring 50 is arranged between the foot 24 and a part 52 provided with a central boring 54 and connected by a screw connection 56 with the pole piece 20 so that the spring 52 forms a member pressing the foot 24 against the shoulder 58 of the pole piece 20.

The operation of this device is as follows:

The incoming beam or ray 22 of electrons or ions passes through the boring 12 of the band 10 and continues its path through the hollow space inside the magnetic pole piece 20 until it escapes through the central boring 54 of the part 52 forming the cover of the diaphragm arrangement. Adjustments of the arrangement can be made by the diaphragm centering members 28, 28', 28" and 46 whereas current is supplied to the diaphragm 10 by means of the current carrying member 46 being in conductive connection with the holding rod 16 which in turn is connected to the platinum strip or band 10 connected to the holding rod 14 which is conductively connected with the magnetic pole piece 20 which is at ground potential. Therefore it will be seen that no polarizing charge may hold itself on the strip 10 forming the diaphragm so that a course of the beam is obtained which is not disturbed by polarizing charges.

Referring now to Fig. 4, the subsequent parts of the magnetic pole shoe lens are shown which contains the aperture diaphragm or stop described hereinabove. The pole pieces 20 and 102 form, respectively, the north pole and the south pole of the pole piece lens being excited by exciting coils one of which is shown at 104. The pole pieces 20, 102 consisting of iron are sealed by rubber sealing rings such as 106 against a casing 108 consisting preferably of brass. An evacuated space 110 in interior of the pole piece 102 forms an entrance chamber for the beam 22 of electrons or ions passing through the boring 114 of the south pole 102, the evacuated space 116 separating the pole piece 102 from the pole piece 20, and enters the boring 118 of the north pole forming pole pieces 20. Inside the boring 118 of the north pole 20 is arranged the platinum strip 10 provided with the boring (not shown) and connected with the other parts of the embodiment shown in Figs. 1 to 3. Rubber sealing rings 128, 130 and 132 seal the interior of the diaphragm room against the atmosphere.

Referring now to Figs. 5–7 a diaphragm shaped as a band 200 consisting preferably of platinum is provided with an aperture slit 202 (Fig. 6a). The platinum band 200 is preferably 1 millimeter wide and about 30μ thick. It is arranged at the boundary of the magnetic field of a precision mass spectrometer, means being provided for electrically heating the band 200. The band 200 is screwed to a stationary holding arm 204 and to a swingable holding arm 206 which serves at the same time as an insulated current lead to the band 200. The stationary holding arm 204 is secured to the bottom of the tubular member 212 by means of two screws 205 and forms the current lead connected to the mass.

The bent holding arm 206 is connected by means of a hinge 214 with a stationary continuation 216. A spring (not shown) attached to the continuation 216 presses against the movable arm 206 and serves for tensioning the band 200. Thereby the holding arm 206 carries out a rotational movement like that of shears, the arms of the hinge 214 being the axis of rotation. In order to secure the movable arm 206 in position vertically to rotational movement thereof, the arm 206 is provided with a fused bead 210 consisting of molybdenum glass which slides in a stationary guiding slot 211 provided in the bottom of the tubular member 212. The continuation 216 of the holding arm 206 serves as the current lead and is held in position in the tubular part 218 by a suitable packing including two insulators 220, 224 consisting of porcelain or Plexiglas with a resilient washer 22 consisting preferably of rubber. The insulator 220 is moved by a screw connection (not shown) in the direction towards the insulator 224 so that by a compressing of the packing disk 222 the current lead 216 is rendered tight against the outer air. The current lead 216 is anchored within the forward portion 224 of the packing by a wedge 226. It will be understood that the arm 206 may carry out small deviations which displace the band 200 in its own plate in the direction of the slit if the band 200 is heated by current, the aperture slit 202 of the band remaining in the same plane. The band 200 is arranged within the evacuated space 228 comprised between the edges such as 230 of the pole shoes 232 and 234. The pole shoes 232 and 234 are provided with sealing means such as 236 and continued towards the side of the incoming rays 238 by the walls of a tube 240 provided with a branch 242 leading to a pump (not shown) for establishing a vacuum in the evacuated space 228. The rays 238 pass the aperture 202 of the diaphragm 200 and after passing the opening 244 arranged in alinement with the aperture 202 they pass through the space 246 separating the brass strips 247 and 248 between the pole shoes 232.

The diaphragm according to the invention forms a stop by which a course of the beam or rays is obtained which is not disturbed by an electric charge of the diaphragm.

Preferably the diaphragm consists of a material such as platinum which can be heated to very elevated temperatures, oxide films on the diaphragm decomposing and/or vaporizing at relatively low temperatures, for instance, a decomposition and/or vaporization of oxide films or platinum strips will be caused of approximately 550° C.

The diaphragm is designed so that a slight withdrawal of heat is obtained in combination with a stable position of the aperture of the diaphragm.

The diaphragm is preferably designed so as to be heatable periodically or even permanently to temperatures up to 900° C. by electron impact or by Joule's heat. By heating the diaphragm, for instance, shortly before a photographic exposure or before measurements, the skins if any, consisting of metal oxide, are removed and insulating organic deposits on the diaphragm are converted into carbon layers having an adequate conductivity. Such insulating deposits are well known to be generated continually by the action of the beam on the residual gas. However, on a diaphragm cleaned or treated in this manner no polarizing charges will be found even if electron or ion beams of an elevated current density impinge on the diaphragm.

The diaphragms according to the invention are suitable not only for electron microscopes and mass spectrometers as described hereinabove, but also for instruments using the diffraction of electrons, electron beam oscillographs, instruments for carrying out the electron-optical Schlieren method, and so on; the mechanical parts connected with the diaphragm depend on the application. In most cases the dimensions of the band forming the diaphragm according to the invention may be chosen so as to obtain heating currents of the order of 10 amps.

Referring now to Fig. 8 of the drawings a pole shoe system is shown with the position of the object between pole shoes or pieces. The pole shoes 302 have pole tips 304 which are magnetically saturated. The pole shoes 302 consist preferably of a material being practically, particularly in the neighborhood of the tips 304 homogeneous and free from cavities. Preferably the material of the pole shoes 302 and the tips 304 thereof is practically free from mechanical stresses, particularly from stresses being asymmetrical with respect to rotation about the axis 306 of the objective. The pole pieces 302 are inserted into a brass casing 308 so as to limit two conical spaces 310 separating the pole pieces 302 from one another. The brass casing 308 is provided with central borings 312 in which a carrier 314 is movable in the directions of the double arrows 316 and 318 shown in Fig. 8. The object 320 is arranged on the carrier 314 which is provided with a boring or opening 322 in alignment with the axis 306 of the objective. Thus the object 320 may be adjusted in the direction of the optical axis 306 and vertically thereto so as to allow a variation of focussing thereof.

The diaphragm 324 is designed substantially as the diaphragm 10 shown in Fig. 1 or in Fig. 4. It consists of a platinum band and is provided with a central opening 326 being aligned with the opening 322 of the carrier 314. The platinum band 324 is secured to two holding rods 328 secured in insulators such as 330 accommodated in a cavity 338 of the lower pole shoe 302. The ends of the holding rods 328 are connected, respectively, to an insulated conductor or rod 332 and a conductor 334 connected to ground and being designed at the same time as a rod serving for the centering of the insulators 330, the holding rods 328, and the diaphragm 324. The rods 332 and 334 are arranged in suitable borings such as 336 of the lower pole piece 302 which is provided with the central cavity 338 receiving the platinum band 324 and the holders 328. Below the insulators 330 a washer 340 is arranged which is held in position by a spring 342 interposed between the washer 340 and a counterwasher 344 screwed into the lowermost part of the magnet 302 so as to form the lowermost closure wall of the cavity 338. The counterwasher 344 is provided with a central opening 346 being aligned with the opening 326 of the platinum band 324, and the boring 322 of the object carrier 314 so that the beam 348 of the electrons substantially coinciding with the axis 306 of the objective may freely pass.

The diaphragm 324 may thus be heated by a current flowing through the insulated conductor 332, the rod 328 connected therewith, the platinum band 324, the other rod 328, and the grounded conductor or rod 334. The platinum band 324 may be heated to temperatures of 600°–1000° C. either permanently or a short time before the objective is used.

Referring now to the embodiment shown in Fig. 9, a pole shoe system is shown in which the object is positioned in a boring of one of the pole shoes. The pole shoes 400 and 402 are provided, respectively, with central borings 404 and 406 which are arranged in the direction of the incoming beam 408 of electrons. In the boring 404 a tube 410 is displaceable in the directions indicated by the double headed arrows 412, a holding sleeve 414 being provided for the tube 410. The beam 408 passes the object 416 arranged above the perforated bottom 418 of the tube 410.

In the gap 420 separating the pole shoes 400 and 402 from each other a diaphragm 422 consisting preferably of a platinum band is arranged and has a boring 424 which may be adjusted so as to be in line with the opening in the bottom 418 of the tube 410. The platinum band is held by holders 426 and 428. The holders 426 and 428 are inserted in an insulating ring 430 and connected with current leads 434 and 436. The ring 430 is adjustable. For tensioning the platinum band 422 a spring (not shown) consisting of molybdenum or the like may be inserted between one holder 426 and the band 422. The brass piece such as 438 being in contact with the pole shoe 402 serve as support for the insulating ring 430.

The operation of the embodiment shown in Fig. 9 is substantially the same as that of the embodiment shown in Fig. 8 except that the object 416 and the tube 410 holding the same are arranged within the boring 404 of the pole shoe 400 whereas the platinum band serving as a diaphragm 422 is arranged between the pole shoes 400 and 402 in the gap 420.

Referring now to Fig. 10 showing a structural embodiment of a complete objective the electron beam 500 enters a central boring 502 provided in an iron part 504. A first pole piece or pole shoe 506 is connected with the iron part 504 and provided with a boring 508 being coaxial with the boring 502 and communicating with a gap 510 separating the first pole shoe 506 from a second pole shoe 512 having an axial boring 514 being aligned with the borings 502 and 508 and a boring 516 provided in the center of another iron part 518. Thus it will be seen that the electron beam 500 may pass through the borings 502, 508, 514, and 516.

The upper iron part 504 is continued in horizontal direction by the plate 520 also consisting of magnetic material and provided with recesses such as 524 which are closed by the ring plate 522 so as to form channels for carrying a cooling fluid such as water which cools efficiently the coil 526 energizing the magnetic circuit including the first pole piece 506, the iron part 504, the iron plate 520 and the below described parts 540, 530, 518, 512 and gap 510. The coil 526 abuts against the iron part 504 and the first pole piece 506, a ring 528 consisting of resilient material such as a rubber being interposed between the coil 526 and the iron part 504 and the first pole shoe 506.

The other iron part 518 is connected with the iron plate 530 provided with recesses such as 534 which also form channels carrying a cooling agent such as water for cooling effectively the second coil 536 exciting the magnetic circuit too. Other parts of the magnetic circuit are the second pole piece 512, the iron part 518 and the iron plate 530. The body of the coil 536 abuts against the iron part 518 and the second pole shoe 512 by a rubber ring 538. The iron cylinder completes the magnetic circuit so as to form hollow spaces 544 and 546 for the reception of the pole shoes 506, 512. The gap 510 between the pole shoes 506 and 512 is closed on each side by the brass ring 548 having walls sealed against the pole shoes 506 and 512 by rubber rings such as 552. The brass ring 548 is inserted in the brass block 554 which has an axial boring 555 manufactured with greatest precision, and bearing surfaces 556 arranged vertically thereto securing the pole shoes 506 and 512 in position. The brass ring 548 is provided with arms 550 for bringing in the object holder rod 558 and for the transmission of the movement of the object. In order to insert the brass ring 548, the brass block 554 is provided with recesses 557 for the arms 550. The brass ring 548 is provided with a longitudinal boring in which a rod 558 is arranged so as to be shiftable in axial direction. The rod 558 passes through a hollow cylindrical part 560 and through a boring 562 of the cylinder 540 and is provided outside the same with a knob 564. Preferably a sealing ring 566 or a simple object sluice seals the interior of the cylindrical part 560 against the outer air. The rod 558 passes through the brass ring 548 which serves as an object table, the end of the rod 558 being designed as a holder 568 for the object. A movement of the object in a plane vertical to the optical axis and in direction of the axis corresponding to the arrows 570 is transferred by external means, to the object table 548 in which the rod holding the object is rigidly inserted. The sealing rings 552 admit of a sufficient mobility of the object table 548.

The pole piece 512 houses in the boring 514 thereof a heatable aperture diaphragm 574 designed as a platinum strip, in a manner similar to that disclosed hereinabove in connection with Figs. 1, 4, and 8. The platinum strip 574 is connected to two rods 516 and 518. A rod 519 is connected with an insulating ring 580 holding the rods 516 and 518 and reaches through a boring 582 of the pole shoe 512, a sealing member 584 preferably consisting of rubber being provided at the point of entry of the rod 519 into the pole shoe 512. Below the ring 580 a helical spring 585 abuts against the same and a ring 586 screwed into the part 518 in a manner as the spring 342 shown, in Fig. 8 abuts against the counterwasher 344.

In order to give an indication of the dimensions of the parts shown in Fig. 10 a distance 588 (Fig. 11) is shown below Fig. 10 which represents a length of 10 centimeters.

Thus it will be seen from what has been said hereinabove that the following four causes prevent by their coaction the theoretical resolving power of an electron supermicroscope from being obtained, namely:

(1) Polarizing charges asymmetrical with respect to rotation and causing an average potential amounting to a few volts; these polarizing charges are formed by the electron beam on the surface films of the aperture diaphragm of the objective owing to insulating surface films which are almost always present.

(2) Asymmetries of the field of a magnetic pole shoe lens objective, due to a magnetic granulation of the material of the pole shoes, that is the finite magnitude of the magnetic primary zones.

(3) Asymmetries of a field of the magnetic pole shoe lens objective due to magnetic inhomogeneities or streaks of the material of the pole shoe caused, for instance, by internal mechanical strains of the pole shoe iron.

(4) Asymmetries due to defects in the mechanical production of the objective and faulty centering of the course of the beam.

While the last mentioned cause may be eliminated by precision work, the causes mentioned under (1), (2), and (3) require particular steps for their elimination. However, only in an objective in which the causes (1)–(3) of the asymmetry are simultaneously avoided the theoretical resolving power is obtainable.

The formation of polarizing charges on the diaphragms is avoided by using sufficiently heatable aperture diaphragms, for instance heatable diaphragms consisting of platinum. If an aperture diaphragm of platinum is heated to relatively high temperatures, for instance from 600° to 1000° C., insulating films can be entirely avoided, and especially those which are continuously reproduced from organic residual vapors by the electron beam. The insulating layers of condensate are transformed by heating into conductive carbon layers whereas the insulating platinum oxide surfaces are decomposed and evaporated at the mentioned temperatures. Thus it is seen that, particularly if the aperture diaphragm is permanently heated but also if it is heated for a short time immediately before the exposure, insulating surface films and thus polarizing charges may be entirely avoided.

If the material of the pole shoes is polycrystalline the magnitude of the magnetic zones may surpass or fall below the size of the crystals. A conception of the magnitude of the dimensions of the primary zones has been derived from studies carried out with the powder method which has shown that the magnitude of the surface zones diminishes with increasing magnetic excitation. If the pole shoe tips are magnetically excited to saturation, the disturbing magnetic fine structure should vanish because all zones have assumed a magnetization of equal direction. Since the portion of the magnetic field of an objective lens which determines the resolving power is mostly generated by the field lines emanating from the pole shoe tips the portion of the asymmetry caused by the magnetic fine structure should be eliminated largely by operating at magnetic saturation. A recent investigation (Lenz-Hahn, journal "Optik," 10. 15., 1953, Fig. 5) shows that the resolving power is at first considerably improved with increasing excitation of the tips of the pole shoes.

The same investigation shows, however, that a strong magnetic excitation and especially at that excitation which would result in the greatest saturation of the pole shoes, has a most surprising result in that the resolving power is diminished very strongly. The analysis shows that just at the transition to the magnetic saturation of the pole shoe tips, the influence mentioned hereinabove under No. 3 of the magnetic inhomogeneities of the material of the pole shoes has a surprising deteriorating effect; for example this effect is found with internal mechanical stresses and cavities. Thus the operation at a high saturation of the pole shoe tips leads only then to an appreciable improvement of the resolving power if simultaneously a pole shoe material is used in which magnetic inhomogeneities or inhomogeneities being asymmetrical with respect to rotation are largely avoided. A material free from inhomogeneities may be obtained if well forged and cavity-free pole shoe iron pieces are freed from all internal mechanical stresses by a thermal aftertreatment. It has been found to be particularly advantageous to use at the forging and the thermal aftertreatment as a principal axis associated with the procedures one and the same axis which should represent the axis of the objective during the manufacture of the pole shoes. By the latter precaution it is obtained that all internal stresses and inhomogeneities which might still exist have an axially symmetrical course with respect to the axis representing later the axis of the objective so that detrimental lateral deviations of the beams and spoiling of the image are avoided.

I have described hereinbefore my invention in connection with two preferred embodiments of a diaphragm for electron-optical instruments. However, I wish it to be understood that changes, modification, and substitutions of equivalents may be made in the embodiments described hereinbefore without departing in any way from my invention which is defined by the appended claims.

I claim:
1. In an electron microscope objective, in combination, an aperture stop, means for rendering said aperture stop free from polarization, magnetic pole pieces defining a gap, said aperture stop being arranged in said gap of said pole pieces, said pole pieces having pole tips, and means for exciting said magnetic pole pieces so as to saturate said pole tips magnetically, said pole pieces consisting of a material having reduced magnetic inhomogeneities.

2. In an objective as claimed in claim 1, said aperture stop being heatable so as to render the same free from polarization.

3. In an objective as claimed in claim 2, said aperture stop consisting of platinum, and means for heating said platinum stop to temperatures between 600° and 1000° C.

4. In an objective as claimed in claim 3, said heating means discontinuously heating said platinum stop.

5. In an objective as claimed in claim 3, said heating means continuously heating said platinum stop.

6. In an objective as claimed in claim 3, said pole pieces consisting of a material free from cavities.

7. In an objective as claimed in claim 1, said pole pieces consisting of a material free from internal strains.

8. In an objective as claimed in claim 7, said material being free from structural inhomogeneities which are asymmetrical with respect to the axis of the objective.

References Cited in the file of this patent

UNITED STATES PATENTS

| | | |
|---|---|---|
| 2,247,524 | Schuchmann et al. | July 1, 1941 |
| 2,352,043 | Von Ardenne | June 20, 1944 |